US010671312B2

(12) United States Patent
Huang et al.

(10) Patent No.: US 10,671,312 B2
(45) Date of Patent: Jun. 2, 2020

(54) STORAGE SYSTEM AND STORING METHOD

(71) Applicant: Acer Incorporated, New Taipei (TW)

(72) Inventors: Yi-Jhong Huang, New Taipei (TW); Tz-Yu Fu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/028,697

(22) Filed: Jul. 6, 2018

(65) Prior Publication Data

US 2019/0317687 A1  Oct. 17, 2019

(30) Foreign Application Priority Data

Apr. 13, 2018 (TW) .............................. 107112814 A

(51) Int. Cl.
*G06F 3/06* (2006.01)

(52) U.S. Cl.
CPC .......... *G06F 3/0647* (2013.01); *G06F 3/0604* (2013.01); *G06F 3/0676* (2013.01); *G06F 3/0679* (2013.01)

(58) Field of Classification Search
CPC .... G06F 3/0647; G06F 3/0679; G06F 3/0604; G06F 3/0676
See application file for complete search history.

(56) References Cited

U.S. PATENT DOCUMENTS

| 9,280,472 B1 | 3/2016 | Dang et al. |
| 2010/0232057 A1 | 9/2010 | Sanvido et al. |
| 2016/0239222 A1* | 8/2016 | Shetty ................. G06F 3/0613 |
| 2016/0267930 A1* | 9/2016 | Chu ...................... G11B 5/012 |
| 2016/0378357 A1 | 12/2016 | Aoki et al. |

FOREIGN PATENT DOCUMENTS

| CN | 101256535 A | 9/2008 |
| TW | 201721632 A | 6/2017 |
| WO | WO 2016/037499 A1 | 3/2016 |

OTHER PUBLICATIONS

Sparsh Mittal, A survey of cache bypassing techniques, Journal of Low Power Electronics and Applications 6, No. 2 (Year: 2016).*
C.-. Chi and H. Dietz, "Improving cache performance by selective cache bypass," [1989] Proceedings of the Twenty-Second Annual Hawaii International Conference on System Sciences. vol. 1: Architecture Track, Kailua-Kona, HI, USA, 1989, pp. 277-285 vol. 1. (Year: 1989).*
Extended European Search Report, dated Feb. 22, 2019, for European Application No. 18185842.4.
Pitchumani et al., "SMRDB: Key—Value Data Store for Shingled Magnetic Recording Disks," Proceedings of the 8th ACM International Systems and Storage Conference, SYSTOR '15, Haifa, Israel, May 26-28, 2015, 11 pages, XP055555773.

* cited by examiner

*Primary Examiner* — Ramon A. Mercado
(74) *Attorney, Agent, or Firm* — Birch, Stewart, Kolasch & Birch, LLP

(57) ABSTRACT

A storage system including a random access memory, a hard disk, a non-volatile memory and a processing circuit is provided. The hard disk includes a media cache. When the processing circuit is to store data in the random access memory to the hard disk, the data in the random access memory are firstly stored to the non-volatile memory. Afterwards, the data in the non-volatile memory are directly written to a number of continuous sectors in the hard disk without being stored in the media cache of the hard disk.

6 Claims, 1 Drawing Sheet

100

200

STORAGE SYSTEM AND STORING METHOD

This application claims the benefit of Taiwan application Serial No. 107112814, filed on Apr. 13, 2018, the subject matter of which is incorporated herein by reference.

BACKGROUND OF THE INVENTION

Field of the Invention

The invention relates in general to a storage system, and more particularly to a storage system using a non-volatile memory.

Description of the Related Art

In response to the users' increasing requirement of the capacity of data storage, the manufacturers of storage devices have adopted several technologies to increase the capacity of storage devices. For example, hard disk manufacturers use the perpendicular magnetic recording technology, the shingled magnetic recording technology and the helium filling technology to increase the capacity of hard disks.

Apart from increasing the capacity of hard disks, some hard disks can further achieve a better access performance by adopting different write modes according to the data types. For example, when data are written in a continuous write mode, that is, data will be stored to a number of continuous sectors in a hard disk, the hard disk will directly write data to the continuous sectors. When data are written in a random write mode in which data will not be stored to a number of continuous sectors in a hard disk, data are firstly written to a cache of the hard disk and then are written to corresponding sectors from the cache. Thus, the random write performance of the hard disk can be increased. For example, the hard disk using the shingled magnetic recording technology will use a media cache to increase the random write performance.

The hard disk using the above mechanisms can increase the random write performance. However, when the system or the hard disk is in an idle state, more background activities are required to write the data which is originally written to the cache of the hard disk in a random mode to corresponding sectors. Under such circumstance, not only will the quantity of background activities will greatly increase and a large amount of power will be consumed, the risk of the hard disk being damaged due to vibration or collision during the background activities will increase.

Although some manufacturers try to increase the access performance of the hard disk by using the random access memory or the flash memory as the cache of the hard disk, the power consumption and the risk of the hard disk being damaged during the background activities associated with the random write mode still cannot be reduced.

Therefore, how to resolve the hard disk problems associated with the background activities, increase the performance and reliability, and reduce the power consumption of the hard disk has become a prominent task to the industries.

SUMMARY OF THE INVENTION

According to one embodiment of the present invention, a storage system including a random access memory, a hard disk, a non-volatile memory and a processing circuit is provided. The hard disk includes a media cache. When the processing circuit is to store data in the random access memory to the hard disk, the data in the random access memory are firstly stored to the non-volatile memory. Afterwards, the data in the non-volatile memory are directly written to a plurality of continuous sectors in the hard disk without being stored in the media cache of the hard disk.

According to another embodiment of the present invention, in the storage system mentioned above, the quantity of the plurality of continuous sectors is an integral multiple of the quantity of sectors in one block, and the block has a predetermined integer quantity of sectors.

According to another embodiment of the present invention, in the storage system mentioned above, the sum of data amount of the plurality of data is less than or equal to the sum of data amount of the integral multiple of the quantity of sectors in one block.

According to another embodiment of the present invention, in the storage system mentioned above, when the processing circuit is to read at least a part of the plurality of data from the hard disk and write the at least a part of the plurality of data to the random access memory, at least a part of the plurality of data are firstly stored in the media cache, then the at least a part of the plurality of data are transmitted from the media cache to the random access memory.

According to another embodiment of the present invention, in the storage system mentioned above, at least a part of the plurality of data are transmitted from the media cache to the non-volatile memory, and then the at least a part of the plurality of data are transmitted from the non-volatile memory to the random access memory.

According to another embodiment of the present invention, in the storage system mentioned above, the access speed of the non-volatile memory is slower than the access speed of the random access memory and faster than the access speed of the hard disk.

To summarize, the storage system of the invention avoids the background activities during the random write mechanism, not only increasing the access performance of the hard disk but also reducing the power consumption of the hard disk and the risk of the hard disk being damaged during the background activities.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
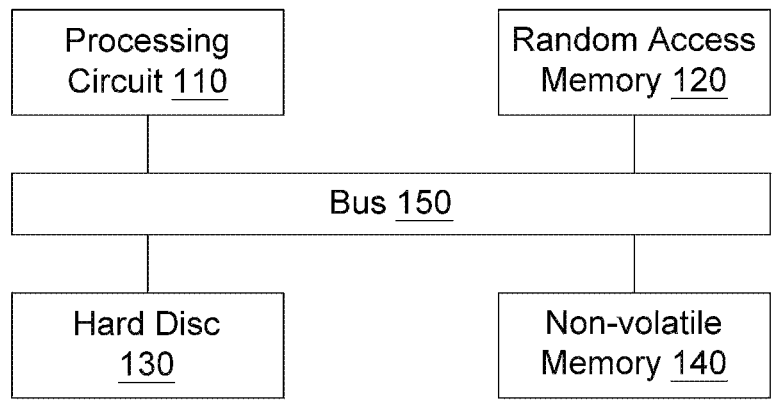
FIG. 1 is a functional block diagram of a storage system according to an embodiment of the invention.

FIG. 1 is a functional block diagram of a storage system 100 according to an embodiment of the invention. The storage system 100 includes a processing circuit 110, a random access memory 120, a hard disk 130, a non-volatile memory 140 and a bus 150. To simplify the drawings and make it easier to understand, other elements of the storage system 100 are not illustrated in FIG. 1.

In the present embodiment, the processing circuit 110 can be implemented by a microcontroller, a microprocessor, a digital signal processor, an application specific integrated circuit (ASIC), a logic circuit, or the like. The processing circuit 110 is configured to execute an operating system or other user-specified programs.

In the present embodiment, the random access memory (RAM) 120 is a volatile memory having a faster access speed, and can be implemented by a suitable dynamic random access memory (DRAM), a static random access memory (SRAM), or the like. The random access memory 120 can store the data necessary for the processing circuit 110 to execute the operating system or other user-specified programs.

In the present embodiment, the hard disk 130 can be implemented by a shingled magnetic recording hard disk. The hard disk 130 includes a media cache (not shown), and is configured to output the stored data under the control of the processing circuit 110 or write data to the internal storage space of the hard disk 130. In the present invention, the media cache of the hard disk 130 is used for increasing the read speed of data but not for increasing the write speed of data.

In the present embodiment, the non-volatile memory 140 can be implemented by a ferroelectric RAM, a magnetoresistive RAM, a resistive RAM, a phase-change memory, or the like. Both the access speed and lifespan of the non-volatile memory 140 are higher than that of the flash memory. In comparison to the 100,000 program/erase counts of the flash memory, the non-volatile memory 140 can be formed of a device having a better durability according to design considerations. For example, the non-volatile memory 140 can be formed of an Intel® Optane storage device, which has an access speed between that of the dynamic random access memory and that of the flash memory and has durability higher than that of a conventional flash memory. The access speed of the non-volatile memory 140 is slower than that of the random access memory 120 but is faster than that of the hard disk 130. Thus, the non-volatile memory 140 can assist the operation of the hard disk 130 to increase the performance of the hard disk 130.

In the present embodiment, the bus 150 can be implemented by various buses using one or more technique. The bus 150 enables the processing circuit 110, the random access memory 120, the hard disk 130 and the non-volatile memory 140 to transmit and receive signals by being electrically coupled to the bus 150. For example, signals can be transmitted between the processing circuit 110 and the random access memory 120 through a memory bus; signals can be transmitted between the processing circuit 110 and the hard disk 130 and the non-volatile memory 140 through a bus adopting the peripheral component interconnect express (PCIe) technology or the serial advanced technology attachment (SATA) technology. To simplify the drawing and make it easier to understand, various bus connections between the elements disclosed above are integrally illustrated as the bus 150.

In an embodiment, the hard disk 130 and the non-volatile memory 140 are integrated as a storage device by a driver in the operating system, and the processing circuit 110 accesses the integrated device of the hard disk 130 and the non-volatile memory 140 through the driver in the operating system. In another embodiment, the processing circuit 110 can cooperate with the control circuit of the hard disk 130 (not shown) or the control circuit of the non-volatile memory 140 (not shown) to access the hard disk 130 and the non-volatile memory 140. Besides, the hard disk 130 and the non-volatile memory 140 are illustrated as two functional blocks for the convenience of explanation. In practical application, the hard disk 130 and the non-volatile memory 140 can be integrated in the same hard disk product or can be implemented by multiple electronic products.

In an embodiment, when the processing circuit 110 is configured to read data from the hard disk 130 and write data to the random access memory 120, the data in the hard disk 130 can firstly be stored in the media cache of the hard disk 130. Afterwards, the data are transmitted from the media cache to the random access memory 120 via the bus 150. Since the media cache is normally configured in the region of the hard disk 130 having a faster access speed (such as the outmost circles of the disk), the access performance of the hard disk 130 can be improved when data are stored in the media cache of the hard disk 130. In another embodiment, when the processing circuit 110 is configured to store data in the hard disk 130 to the random access memory 120, the data in the hard disk 130 are firstly stored in the media cache of the hard disk 130. Afterwards, the data stored in the media cache are transmitted to the non-volatile memory 140 and afterward transmitted from the non-volatile memory 140 to the random access memory 120 via the bus 150. Thus, the access performance of the hard disk 130 can be improved.

Figure 2:
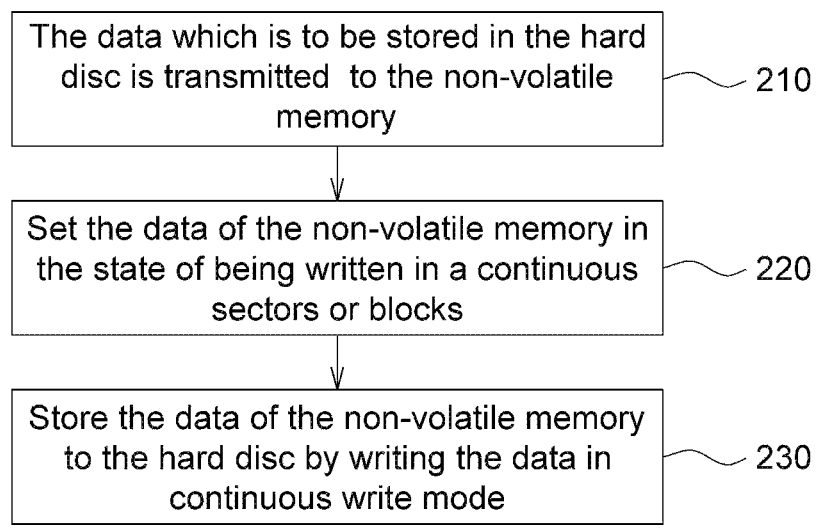
FIG. 2 is a flow chart of a storing method executed by the storage system of FIG. 1.

FIG. 2 is a flowchart of a storing method 200 executed by the storage system 100. The operations of the storage system 100 are explained below with FIGS. 1 and 2.

In step 210, when the processing circuit 110 is configured to write data in the random access memory 120 to the hard disk 130, the data in the random access memory 120 are firstly transmitted to the non-volatile memory 140 via the bus 150. Meanwhile, the data are stored to the non-volatile memory 140 whether the data in the random access memory 120 belong to the data written to the hard disk in a continuous write mode or in a random write mode in the conventional hard disk.

In step 220, when the non-volatile memory 140 needs to write data to the hard disk 130, the control circuit of the non-volatile memory 140 sets the data to be written to the hard disk 130 to be written in a continuous write mode, that is, all the data to be written to the hard disk 130 are stored to continuous sectors in the hard disk 130. In an embodiment, the minimum unit of the data to be written to the hard disk 130 is set as an integral multiple of the quantity of sectors in one block, and each block has a predetermined integer quantity of sectors. For example, when a sector is set as having 512 bytes and a block is set as having 4096 bytes, each block has 8 sectors. Thus, in the present embodiment, the minimum unit of the data to be written to the hard disk 130 is set as an integral multiple of one block, that is, an integral multiple of 8 sectors. Also, the size of a sector and the size of a block can be set by the hard disk manufacturers, the operating system or the users.

In an embodiment, assume a block has 8 sectors. When the first data of 24 sectors and the second data of 16 sectors in the non-volatile memory 140 are to be written to the hard disk 130 and the sum of data amount of the first data and the second data is equal to the data amount of the data of 5 blocks (that is, 40 sectors), the control circuit of the non-volatile memory 140 will store the first data and the second data in 5 continuous blocks, that is, 40 continuous sectors, in the hard disk 130.

In another embodiment, assume a block has 8 sectors. When the third data of 6 sectors and the fourth data of 13 sectors in the non-volatile memory 140 are to be written to the hard disk 130, the sum of data amount of the third data and the fourth data is equal to the data amount of 19 sectors instead of an integral multiple of the quantity of sectors in one block. The control circuit of the non-volatile memory 140 will set the data to be written to an integral multiple of the quantity of the sectors in one block in the hard disk 130, such that the sum of data amount of the data actually written to the integral multiple of the quantity of sectors in one block in the hard disk 130 will be larger than or equal to the sum of data amount of data desired to be written by the non-volatile memory 140. That is, in the present embodiment, the control circuit of the non-volatile memory 140 will store the third data and the fourth data in 3 continuous blocks, that is, 24 continuous sectors, in the hard disk 130. The 5 extra sectors can be written with predetermined digits (such as 1s or 0s) or treated with other suitable processing.

In step 230, the data of the non-volatile memory 140 to be written to the hard disk 130 are stored to the continuous sectors of the hard disk 130 according to the method disclosed in step 220.

In a conventional hard disk, data are stored to the hard disk in a random write mode or a continuous write mode. In the embodiments of the present invention, by the way of storing data in the non-volatile memory 140 and then setting the data as be stored by writing in continuous sectors or in an integral multiple of sectors of one block, data can be stored in continuous sectors of the hard disk 130 in a continuous write mode. Therefore, in the data storing process of the hard disk 130, there is no need to use the media cache of the hard disk 130 to assist the random write mechanism. Therefore, no additional background activities are required to store the randomly written data in the media cache to the sectors of the hard disk 130, and the power consumption of the hard disk can be greatly reduced.

Furthermore, in the embodiments of the present invention, data stored in the non-volatile memory 140 are continuously written to the hard disk 130 through the way of storing data by the unit of blocks. Therefore, the random write mechanism having a slower access speed can be avoided, and the access performance of the hard disk 130 can be increased. Since the write time of the hard disk 130 is shortened, the risk of the disk being damaged due to the vibration or collision generated when data are written to the hard disk 130 can be reduced.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A storage system, comprising:
   a random access memory;
   a hard disk, comprising a media cache;
   a non-volatile memory; and
   a processing circuit configured to store a plurality of data of the random access memory to the hard disk;
   wherein the plurality of data are firstly stored to the non-volatile memory, then the plurality of data in the non-volatile memory are directly written to a plurality of continuous sectors in the hard disk from the non-volatile memory without being stored in the media cache of the hard disk;
   wherein when the processing circuit is to read at least a part of the plurality of data from the hard disk and write the at least a part of the plurality of data to the random access memory, at least a part of the plurality of data are firstly stored in the media cache, then the at least a part of the plurality of data are transmitted from the media cache to the random access memory;
   wherein at least a part of the plurality of data are transmitted from the media cache to the non-volatile memory, and then the at least a part of the plurality of data are transmitted from the non-volatile memory to the random access memory; and
   wherein the media cache is in outmost circles of the hard disk, and an access speed of the media cache of the hard disk is faster than an access speed of other region of the hard disk.

2. The storage system according to claim 1, wherein the quantity of the plurality of continuous sectors is an integral multiple of the quantity of sectors in one block, and the block has a predetermined integer quantity of sectors.

3. The storage system according to claim 2, wherein the sum of data amount of the plurality of data is less than or equal to the sum of data amount of the integral multiple of the quantity of sectors in one block.

4. The storage system according to claim 1, wherein the quantity of the plurality of continuous sectors is an integral multiple of the quantity of sectors in one block, and the block has a predetermined integer quantity of sectors.

5. The storage system according to claim 4, wherein the sum of data amount of the plurality of data is less than or equal to the sum of data amount of the data of the integral multiple of the quantity of sectors in one block.

6. The storage system according to claim 1, wherein the access speed of the non-volatile memory is slower than the access speed of the random access memory and faster than the access speed of the hard disk.

* * * * *